Patented Feb. 12, 1952

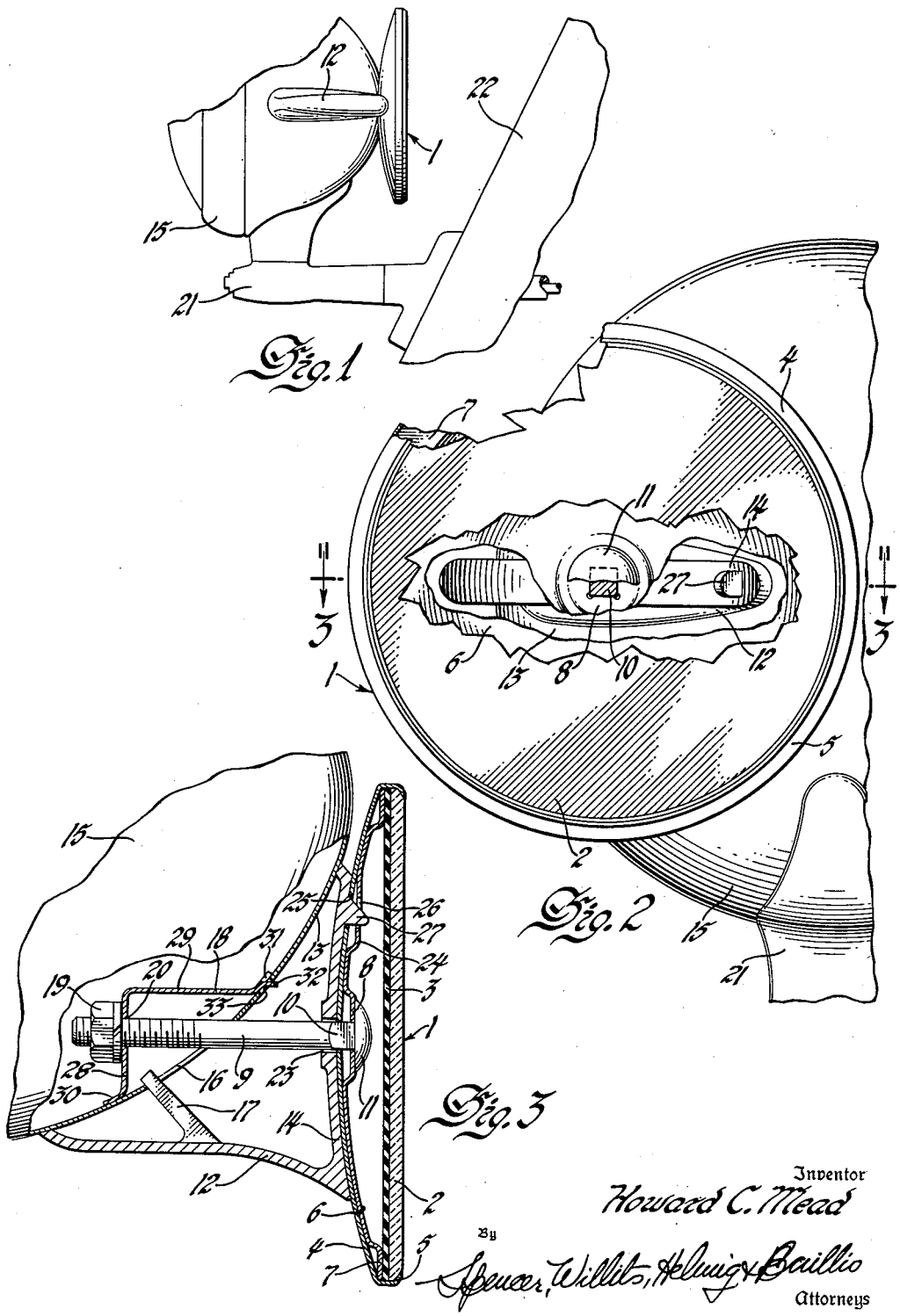

2,585,399

UNITED STATES PATENT OFFICE 2,585,399

SPOT LAMP MIRROR

Howard C. Mead, Anderson, Ind., assignor to General Motors Corporation, Detroit, Mich., a corporation of Delaware Application May 14, 1948, Serial No. 27,072

4 Claims. (Cl. 240—4.2)

This invention relates to spot lamps and rear view mirrors of the type used on automotive vehicles and the like, and more particularly to the securement of a rear view mirror to a spot lamp.

While both a spot lamp and a rear view mirror mounted externally on the side of a vehicle are material aids to safe and convenient operation thereof, the advantage obtained is materially enhanced if they are adjustably movable through controls accessible within the operator's compartment. As has been suggested in the prior art, with the mirror attached to such a dirigibly mounted spot lamp, the lamp control means may be used in adjusting the mirror position when the lamp is not in use.

In making such an attachment of a mirror to a spot lamp, it has been found preferable to use as small a diameter mirror as is practical and to mount it offset from the axis of the lamp. Such an arrangement obtains the optimum compromise between three rather antagonistic considerations—namely (1) maximum visibility from the mirror of objects close to the rear of the vehicle (2) minimum projection of the mirror and spot lamp outward from the side of the vehicle and (3) pleasing external appearance.

It is therefore the principal object of this invention to provide an improved means for attaching a rear view mirror to the spheroidal outer casing of a spot lamp, which means possesses important advantages in manufacturing economy, simplicity of assembly, rigidity of construction, and pleasing external appearance.

The invention including other objects and advantages realized thereby will be fully understood from the following description, together with the drawings in which:

Figure 1 is a side elevation of the spot lamp and rear view mirror forming an embodiment of this invention.

Figure 2 is an enlarged rear elevation of the spot lamp and mirror of Figure 1, with portions of the mirror broken away to expose other parts to view.

Figure 3 is a section on line 3—3 of Figure 2.

As shown in the drawings, the mirror body, indicated generally by the numeral 1, consists of a circular sheet 2 of transparent material such as glass, the back surface of which is coated with a light reflecting medium and painted in conventional manner, a gasket 3, and a supporting frame consisting of the back cover 4 and the spacer member 6. The cover 4 is dished to provide a smooth convex outer surface to the back of the mirror and its peripheral portions form a bezel 5 around the glass 2. The spacer member 6 is also dished to conform to the concave side of the cover 4, except for a flat annular portion 7 adjacent its periphery where it seats against the back of the gasket 3, and flat portions 8 and 24 provided at the center and at a point radially outward therefrom, respectively. Aligned square apertures are provided in the cover 4 and the flat portion 8 of the spacer member 6 for passage of a carriage-head bolt 9 which is installed prior to the assembly of the mirror body and which has the conventional square shank section 10 below the head 11. Aligned apertures 25 and 26 are also provided in the cover 4 and flat portion 24 of the spacer member 6.

A bracket 12 is provided for supporting the mirror 1 on the spheroidal surface of the casing 13 enclosing the spot lamp 15, in a position perpendicular to and offset from the lamp's longitudinal axis. The bracket 12 is preferably formed as a hollow, generally triangular-shaped, one-piece die casting, open on one side which abuts and closely conforms to the spheroidal curvature of the spot lamp casing 13. The rear side 14 of the bracket 12 has a concave external surface to conform to the shape of the mirror back cover 4, an aperture 23 for passage of the bolt 9, and an integral spur portion 27 which projects through the apertures 25 and 26 to lock the mirror body against rotation relative to the bracket 12. The spot lamp casing 13 is provided with an elongated slot 16 of just sufficient width and length to allow free entrance at opposite ends thereof by the bolt 9 and a spur portion 17 formed integrally with the bracket 12. The threaded end of the bolt 9 is secured by a nut 19 which abuts on a bracket 18 bearing against the inner wall surface of the lamp casing 13. The bracket 18, which may be bent from a short strip of sheet metal, consists simply of two leg portions 28 and 29 disposed at preferably a right angle to each other and provided at their respective ends with feet 30 and 31 conforming substantially to the contour of the lamp casing 13. The foot 31 has a tab-like portion 32 which projects outwardly through a slot 33 provided therefore in the lamp casing 13. The leg 28 of the bracket is apertured at 20 for passage of the bolt 9, which together with the tab-like portion 32 serves to hold the bracket 18 from shifting on the inner wall surface of the lamp casing when the nut 19 is tightened.

There is thus provided a very simple and cheap construction for mounting a rear view mirror to the spheroidally curved external surface of a spot lamp, which offsets the mirror laterally outward from the lamp axis for optimum rearward visibility of the vehicle operator, and which requires but a single bolt to secure the parts together.

As shown in Figure 1, the spot lamp is preferably dirigibly mounted through any conventional means, indicated generally at 21, to the vehicle body frame 22, thereby enabling the operator to adjust the angular position of the lamp (and alternatively the rear view mirror, by reason of its attachment thereto) from inside the vehicle body.

I claim:

1. In combination, a spot lamp having a spheroidally curved outer casing, a mirror body, means for securing the mirror body to the lamp casing in offset relation to the longitudinal axis of the spot lamp, including a generally triangular-shaped bracket having angularly adjacent portions in surface contact with the lamp casing and mirror body respectively, said bracket having a third portion extending through the wall of the lamp casing, and a tension member having locking engagement with the mirror body and the lamp casing said third portion and tension member engaging opposite ends of an elongated aperture in said lamp casing.

2. In combination, an automotive vehicle spot lamp having an outer casing of generally spheroidal curvature enclosing its rearward portions, a rear view mirror having a back enclosing frame, a generally triangular shaped bracket spacedly separating the mirror frame from the lamp casing in a position offset from the longitudinal axis of the lamp and in a plane generally perpendicular to said axis, a tension member for securing the mirror frame, bracket and lamp casing in assembled relationship, said bracket and lamp casing being apertured for passage of the tension member, said bracket having portions projecting through the mirror frame and lamp casing for cooperation with the tension member in anchoring the bracket relative to the mirror frame and lamp casing respectively, securing means for the tension member within the lamp casing, and an abutment member for the securing means, said abutment member having a portion projecting through the lamp casing for cooperation with the tension member in anchoring the abutment member relative to the lamp casing.

3. Means for attaching a rear view mirror to the curved side of an automotive vehicle spot lamp, comprising a convex mirror frame, a generally spheroidal shaped lamp casing having a longitudinal axis and an aperture laterally offset from the casing axis and elongated in a plane of said axis, an L-shaped bracket within the casing, the legs of the L shaped bracket having their divergent ends bearing against the inner surface of the casing, one of said legs having an aperture in alignment with the aperture in the casing and the other of said legs having a portion in interlocking engagement with the casing, a generally triangular shaped bracket having two of its sides in socketing relation with the oppositely disposed outer surfaces of the mirror frame and lamp casing respectively, said triangular shaped bracket having a portion projecting into the lamp casing at one extreme end of said elongated aperture, and a bolt secured at one end to the mirror frame and its other end to the apertured leg of said L shaped bracket, said bolt passing through the lamp casing at the opposite extreme end of said elongated aperture from that of said bracket portion.

4. Attachment means for securing a rear view mirror to the spheroidally curved outer shell of a spot lamp, such that the mirror is offset from the longitudinal axis of the lamp and lies in a plane transverse thereto, comprising a frame covering the back of the mirror and dished outwardly therefrom, a bolt extending through the frame and having its head portion between the frame and mirror, a spheroidally curved lamp casing provided with a bracket fixed to the inner wall surface thereof, said casing and bracket being provided with aligned apertures for passage of the bolt, said aperture in the casing being elongated transversely of the longitudinal axis of the lamp, a generally triangular-shaped bracket between the mirror frame and lamp casing and having surfaces conforming to the curvature of each, said last named bracket being provided with a passage therethrough for the bolt and completely concealing the bolt from external view, said last named bracket having a portion projecting into said casing at one extreme end of said casing aperture and said bolt being in engagement with the other extreme end of said casing aperture.

HOWARD C. MEAD.

REFERENCES CITED

The following references are of record in the file of this patent:

UNITED STATES PATENTS

| Number | Name | Date |
| --- | --- | --- |
| 1,308,182 | Leuckert | July 1, 1919 |
| 1,404,281 | Duffy | Jan. 24, 1922 |
| 1,426,250 | Boyer | Aug. 15, 1922 |
| 1,909,526 | Falge et al. | May 16, 1933 |

FOREIGN PATENTS

| Number | Country | Date |
| --- | --- | --- |
| 168,257 | England | Sept. 1, 1921 |